United States Patent [19]

Ebert

[11] Patent Number: 4,523,778
[45] Date of Patent: Jun. 18, 1985

[54] HOSE COUPLING

[75] Inventor: Karl Ebert, Giengen, Fed. Rep. of Germany

[73] Assignee: Max Widenmann, Armaturenfabrik, Giengen, Fed. Rep. of Germany

[21] Appl. No.: 356,530

[22] Filed: Mar. 9, 1982

[30] Foreign Application Priority Data

Mar. 17, 1981 [DE] Fed. Rep. of Germany ....... 3110212

[51] Int. Cl.³ .............................................. F16L 55/00
[52] U.S. Cl. ....................................... 285/73; 285/258
[58] Field of Search ...................... 285/70, 71, 72, 73, 285/74, 258

[56] References Cited

U.S. PATENT DOCUMENTS

| 489,107 | 1/1893 | Storz | 285/73 |
| 894,900 | 8/1908 | Pohlman | 285/70 |
| 1,248,558 | 12/1917 | Scribner | 285/70 X |

FOREIGN PATENT DOCUMENTS

| 1267206 | 6/1961 | France | 285/73 |
| 22753 | of 1893 | United Kingdom | 285/73 |

OTHER PUBLICATIONS

Price List No. 211, 6/1980.
Preiskatalog Nr. 211.
Brochure No. 55, 12/1964.

Primary Examiner—Dave W. Arola
Attorney, Agent, or Firm—Toren, McGeady, Stanger

[57] ABSTRACT

The invention relates to a hose coupling whose halves are held together by identical cam rings (Storz coupling). For the solution of the problem to construct the connections which are to be arranged in the halves of such couplings to be short and light and in one piece and consequently without sealing problems even when the outer diameter of the connection is as large or even larger than the diameter of the cylinder which is limited by the inside of the cams, the joining between the connection and the cam rings is of similar construction as in cam rings of coupled coupling halves in that the connection (3) at its end which is to be joined with a cam ring (1) has an extension (6) which extends radially outwardly, forms a stop and is preferably constructed as a collar. In the cam ring (1) a shoulder (9) of a recess (8) of angular cross-section which extends behind the cams (2) is provided as a counterstop for the extension. This design can be realized when the connection is a hose-fixing connection (3) as well as when it is a threaded connection. It is advantageous that the connection (3) is held in the cam ring (1) by means of a safety mechanism (5) so it cannot be lost.

5 Claims, 6 Drawing Figures

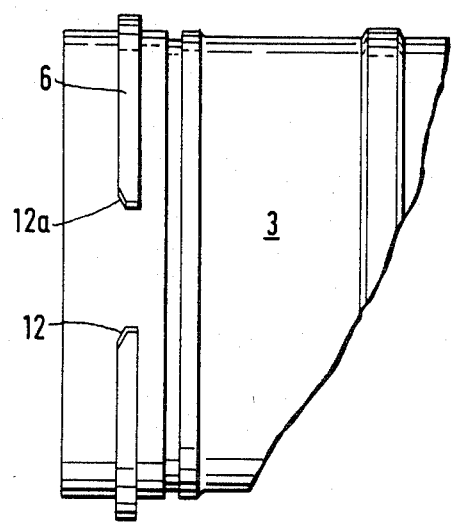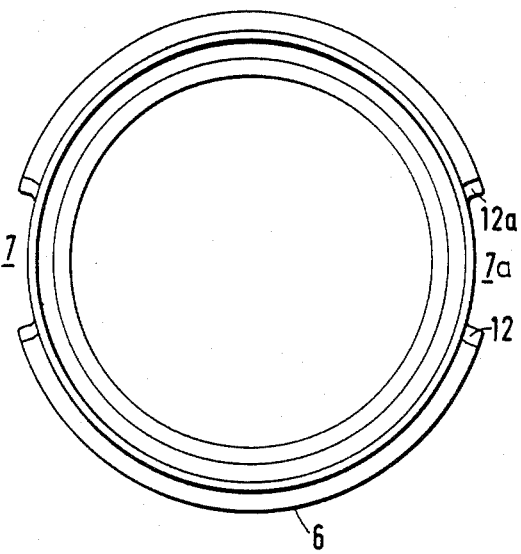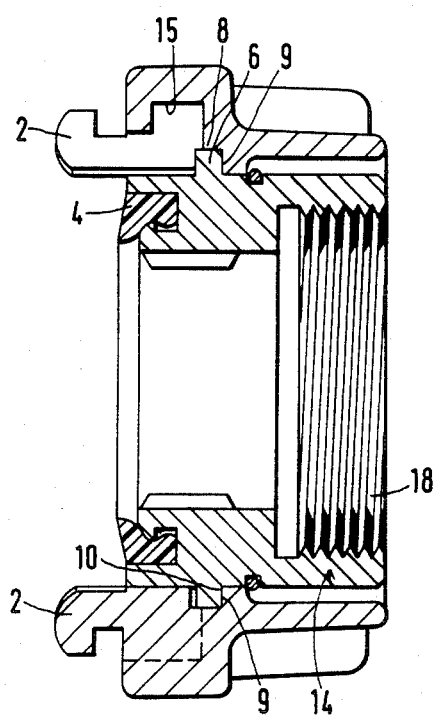

HOSE COUPLING

The invention relates to a hose coupling whose halves are held together by identical cam rings, wherein the cams of the one cam ring can be inserted through cutouts into a circumferential groove of the other cam ring and the thus coupled cam rings can be rotated towards one another into a closed position of the coupling, and wherein in each of the cam rings a connection (hose connection or threaded connection) consisting of one part is held, and when the coupling is closed the rings are pressed against one another and are sealed by means of inserted sealing rings (Storz coupling). Such couplings are known and are used particularly for Fire Department purposes, but also for hose lines which are used for the removal of liquids or other flowable media or as temporary water lines, particularly for hose lines of larger diameter. In the most widely used form, the cam rings have two diametrically opposed cams, however, the invention elucidated below can also be realized in coupling with cam rings which have more than two cams, regardless whether these cams are equally spaced apart or not.

Generally the known couplings of the type described are used with connections which consist of one piece. Since the cam rings and the ends of the connections inserted therein must be constructed in such a way that the connections are securely held and that the end faces of the connections are mutually sealed in the closed coupling, so that suitable sealing rings must be installed therein, the diameters of one-piece connections are much smaller than the diameter of the cylinder limited by the inside of the cams. If, without increasing the outer diameter of the cam rings and without increasing the diameter of the cylinder limited by the insides of the cams, one would wish to combine with these cam rings connections with an outer diameter which is as large or larger than the diameter of the cylinder which is limited by the inner surfaces of the cams, to date the connections were combined of two parts which were connected, preferably screwed, together in the axial direction, of which the one part is inserted from the cam side into the cam ring and the other part is screwed from the opposite side onto the one part (see assignee's brochure number 55 of September 1964, FIG. 113).

The invention is based on the task to create a coupling of the type described above which will function with light and short hose fixing connections or threaded connections which are cost-saving and present no sealing problems, where it is, however, possible to use, in spite of the fact that the connection consists of one piece, larger outer diameters of the connection than were possible to date in one-piece connections, i.e. with outer diameters which are equal or larger than the diameter of the cylinder which is limited by the inner surfaces of the cams and specifically without impairing the advantages of these couplings resulting from the rotatable support of the cam rings on the connection, that is, that the sealing rings are only subject to axial pressure and the hoses are not warped or twisted.

This task is solved according to the invention in that the connection at its end which is to be joined with a cam ring has an extension which extends radially outwardly and forms a stop, that behind the cams of the cam ring a groove-like recess is provided with a width which corresponds to the axial thickness and a depth which corresponds to the radial depth of the extension, and that in the cam ring as a counterstop for the extension a shoulder is provided which extends behind the cams and is separated from the cams by the recesses.

The connection ends which lie in the cam rings are consequently joined in a similar manner with the cam rings as the cam rings of two coupling halves are joined when the coupling is closed. This becomes particularly clear in an embodiment in which the extension of the connection is formed by means of a collar which has cutouts which are appropriate for sliding the collar over the cams of the cam ring.

Advantageously a safety mechanism is provided which holds the extension of the connection in contact at the shoulder of the cam ring. This safety mechanism consists, for instance, of a locking ring which is inserted on the outside of the connection in a circumferential groove provided therein and interacts with the cam ring, or by means of pegs which are inserted into the cam ring, project radially inwardly beyond the cam guide groove in front of the collar, and are arranged on the side of the cams which faces away from the insertion cutout for the cams of the cam ring of the other coupling half.

The drawing shows two exemplified embodiments.

FIG. 3 is a partial view of the hose fixing connection used in the coupling half according to FIGS. 1 and 2, viewed transversely to the axial direction.

FIG. 4 is a view of the same hose fixing connection, viewed in the axial direction.

FIG. 5 is a cross-section similar to FIG. 1 through a second exemplified embodiment in which instead of a hose fixing connection a threaded connection is held in the cam ring.

Figure 1:
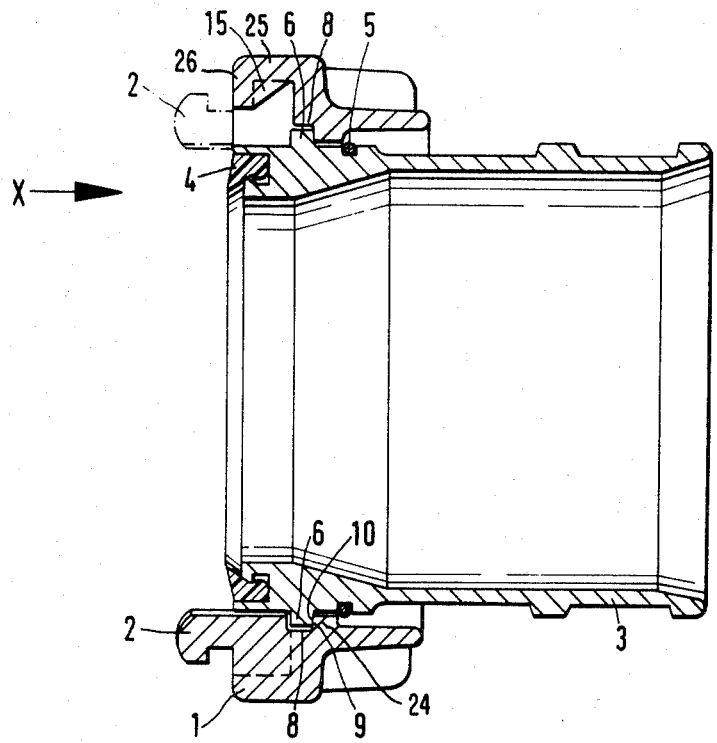
FIG. 1 is a section along line A-B in FIG. 2 through a half of a coupling constructed according to the invention and a first exemplified embodiment with a hose fixing connection.
Figure 2:
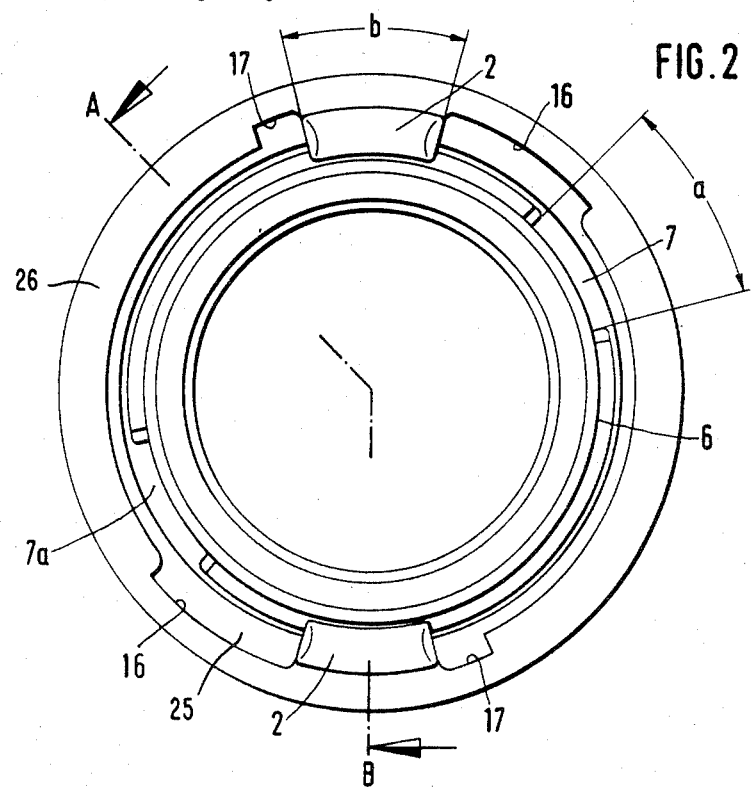
FIG. 2 shows this coupling half in direction of the arrow X in FIG. 1.

In the embodiment according to FIGS. 1 to 4, a cam ring 1 of a coupling half has two diametrically opposite hook-shaped cams 2. From the side which faces the other coupling half, i.e. in direction of the arrow X in FIG. 1, a fixing tubular connection or sleeve 3 is inserted into the cam ring 1 and in the end of the connection or sleeve which is in the cam ring 1 a sealing ring 4 is inserted. Near this end face on the fixing connection 3, at least one extension which extends radially outwardly is provided which in the shown embodiment has the shape of a collar 6. This collar 6 has two diametrically opposite cutouts 7 and 7a which are so large that they permit a sliding of the connection 3 relative to the cams 2 of the cam ring 1. The length of the cutouts in the arc measure a is also at least as large as the width of the cams 2 in the arc measure b. The cam ring 1 contains a circumferentially extending cam guide group 15 located on the same side of the groove 15 limited on the same side of the groove 15 as the cams by a strip or gib 26 which has insertion openings or cutouts 16 for the cams on the cam ring of the other coupling half. The cam ring 1 has an angular recess 8 formed in the radially inner part of the base 25 of the groove 15 which recess extends between the cams 2 and forms a groove of U-shaped cross-section. One radially extending side of the recess forms a shoulder 9 which represents a counterstop for the collar 6 and at the same time forms the end face of an annular rib formed in the cam ring 1. The inner diameter of the annular or ring rib 24 is equal to or larger than the diameter of a cylinder defining the radially inner surface of the cam 2. If one wants to insert the connection into the cam ring 1, it is inserted into such an anglular position that the cutouts 7 and 7a of the ring 6 can slide over the cams 2 until the ring 6 with its end face 10 rests against the shoulder 9.

As a guarantee that the collar 6 of the connection 3 remains in contact at the shoulder 9 of the cam ring 1, in the shown embodiment a locking ring 5 is provided which on the side that projects through the cam ring is inserted into a circumferential groove which is provided in the jacket of the connection 3 and interacts with the cam ring.

If the coupling is to be closed, the cams of the cam ring of a second coupling half are inserted into the insertion openings 16 of the cam ring of the first coupling half and during closing, which takes place by rotating the coupling rings towards one another, the coupling moves further in a circumferential cam guide groove 15. So that this motion is not hindered even when the safety ring 5 does not hold the end face 10 of the collar 6 tightly at the shoulder 9, the cutouts 7 and 7a are provided at their outer edges with bevels 12 and 12a.

This safety mechanism only has the purpose to prevent, in the state of material as supplied, that the connection, if it unintentionally reaches the angular position which fits with its cutouts over the cams, falls out of the cam ring. Instead of a locking ring 5, the safety mechanism could also be replaced by pegs which project radially inwardly beyond the cam guide groove 15 in front of the collar. These pins would have to be arranged on the side of the cams which faces away from the insertion opening 16 for the cams of the cam ring of the other coupling half. On that side of the cams there is a window 17 next to which the cam guide groove 15 usually has a stop which is fixed in the coupled position. If the described pegs are provided, they may form at the same time the stop for the cams of the cam ring of the other coupling half in the closed position of the coupling.

In the embodiment according to FIG. 5 the connection is constructed as a threaded connection or sleeve 14 to screw the coupling half to a not shown armature. The connection or sleeve has an internal thread 18. A modification results when instead of the internal thread 18 an external thread is provided.

Figure 6:
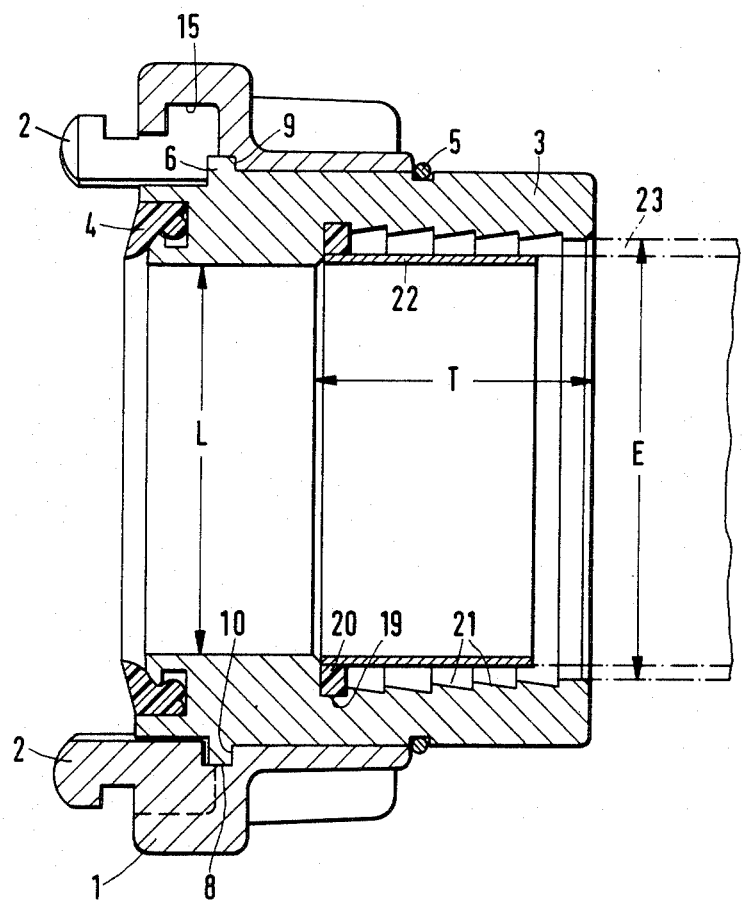
FIG. 6 is a cross-section similar to FIGS. 1 and 5 through a third exemplified embodiment in which the fixing connection is equipped for internal fixing of a hose.

In the embodiment according to FIG. 6 the connection or sleeve 3 has at its end which faces away from the cam ring 1 an inner recess with the inlet diameter E and the depth T which ends in a circumferential groove 19 which has a larger diameter than the inlet diameter T and into which a sealing ring 20 is placed. Above the depth T in the recess, beginning at its inlet, circumferential grooves 21 follow in succession which are shaped in the cross-section like sawteeth in such a way that the tooth back is inclined inwardly towards the end of the connection 3 which rests in the cam ring 1, while the tooth face which lies in a transverse plane extending perpendicularly to the connection axis always faces towards the same end of the connection. The depth of the circumferential grooves 21 increases from the outer end of the connection towards the groove 19 so that the groove 21 which adjoins the groove 19 is the deepest. Into the recess of the connection which is limited by the grooves a hose 23 shown in phantom can be inserted. In order to be able to clamp the hose after insertion into the groove 21 from the inside towards the outside, from the side of the cam ring 1 a sleeve 22 is inserted which has an outer diameter which is so much smaller than the inner diameter L of the connection section which faces the cam ring 1 so as to obtain a play which permits sliding. The inner diameter in turn is again narrower than the inlet diameter E at the other end of the connection. When the sleeve 22 is inserted so far into the hose 23 which is located in the area of the recess so that the sleeve is entirely in this region, it is expanded from the cam ring side by means of a special tool so that it presses the hose in the radial direction into the grooves 21 until it finally has, as shown in FIG. 6, the same inner diameter L as the section of the connection 3 which faces the cam ring 1.

Regarding the state of the art referred to above under the keyword "Storz coupling" on page 1, line 10, we refer, for instance, to the assignee's price list No. 211 of June 1980, page 5. Regarding nozzles of larger diameter consisting of two screwed parts, mentioned as state of the art on page 2, line 15, we refer to the assignee's brochure No. 55 of September 1964, FIG. 113.

I claim:

1. A hose coupling comprising a pair of coupling halves, each said coupling half comprising a similar cam ring arranged for securing said coupling halves together, each said cam ring having an axis and a first end and a second end spaced apart in the axial direction of said cam ring, at least two cams formed on the first end of each said cam ring, each said cam ring having an axially extending radially inner cam ring surface forming the radially inner surface of said cams, a circumferentially extending groove formed in said inner cam surface and cutouts formed in said inner cam ring surface opening from said first end into said circumferentially extending groove so that said cams on each of said cam rings can be inserted through the cutouts into said circumferentially extending groove in the other of said cam rings and then rotated about said cam ring axis relative to the other said cam ring for interengaging said coupling halves and placing said hose coupling in the closed position, a separate unitary tubular connection member having a central axis secured to each said cam ring so that said cam ring is rotatably supported on said connecting member, and each said tubular connection member having a first end and a second end spaced apart in the axial direction thereof and an axially extending outer surface and axially extending inner surface, each said connection member having a sealing ring in the first end thereof so that said sealing rings contact and provide a seal when said coupling halves are interconnected, wherein the improvement comprises that said circumferentially extending groove comprises a first side and a second side disposed in spaced relation in the axial direction of said cam ring and extending radially outwardly from said radially inner cam ring surface, and a bottom spaced radially outwardly from said radially inner cam ring surface and extending axially between said first and second sides, said first side of said circumferentially extending groove being located closer to the first end of said cam ring than said second side, said first end of said cam ring includes a circumferentially extending strip extending between each cam from said cutouts around the axis of said cam ring and having a pair of radially extending side surfaces extending transversely of the axis of said cam ring with one of said side surfaces forming said first side of said circumferentially extending groove, a recess (8) formed in said second side of said circumferentially extending groove and also in said radially inner cam ring surface of said cam ring so that said recess extends in the axial direction of said cam ring toward the second end thereof from said second side of said circumferentially extending groove and radially outwardly from said radially inner cam ring surface, said recess having a radially extending side spaced axially from the second side of said circumferentially extending groove and forming a shoulder (9), said connection member adjacent the first end thereof has circumferentially extending extensions (6) projecting radially outwardly from the outer surface thereof corresponding to the radial depth of said recess (8) radially outwardly from said radially inner cam ring surface, said extensions (6) form a stop extending angularly around said connecting member in the circumferential direction thereof for a maximum angular distance corresponding to the angular spacing between the adjacent surfaces of two said cams, said recess having a width corresponding to the axial thickness of said extensions so that each said connection member can be inserted axially into the corresponding said cam ring until said extensions (6) contact said shoulder (9) when said hose coupling is in the closed position.

2. A hose coupling, as set forth in claim 1, wherein said extensions (6) are formed as a collar extending circumferentially around the outer surface of said connection member.

3. A hose coupling, as set forth in claim 2, wherein means are provided for holding said extensions (6) on said connection member in contact with the radially extending side of said recess spaced more remotely from the first end of said cam ring.

4. A hose coupling, as set forth in claim 3, wherein said means comprises a circumferential groove formed in the outer surface of said connection member and spaced from said extensions (6) in the direction toward the second end of said connection member, a locking ring (5) inserted into said circumferential groove and extending outwardly from the outer surface of said connecting member into contact with the radially inner surface of said cam ring.

5. A hose coupling, as set forth in claim 1, including means on said connecting member adjacent the second end thereof for securing a tubular member to said connecting member.

* * * * *